Patented Dec. 31, 1946

2,413,321

UNITED STATES PATENT OFFICE 2,413,321

METHOD OF PRODUCING ALKALINE EARTH METAL SULFITES AND PRODUCT THEREOF

Gerald Haywood, Westernport, Md., and Wright M. Welton, Piedmont, W. Va., assignors to West Virginia Pulp and Paper Company, New York, N. Y., a corporation of Delaware Application March 13, 1941, Serial No. 383,148

16 Claims. (Cl. 23—129)

This invention relates to an improved method of and apparatus for producing, in finely divided state, either substantially pure calcium sulfite, or mixtures of calcium and magnesium sulfite or mixtures of either or both of the sulfites with the corresponding carbonates. It has particular reference to the production of such salts in a form suitable for use as a pigment material and especially as a pigment in coating compositions for coated papers. The improved salts or mixtures resulting from the improved method, and the improved coating compositions embodying said salts or mixtures, also constitute a part of the present invention.

In attempting to utilize in coating compositions certain of the salts of the character mentioned, as heretofore produced, it has been found that an excessive amount of casein, or other adhesive substance, has been required to insure proper adhesion of the coating to the surface of paper stock or the like. Thus, a finely divided, precipitated chalk or calcium sulfite, as heretofore produced, has been found to require the presence of an excessive amount of casein in a coating composition formed primarily from these substances. The casein must be used to the extent of between 25 and 40%, by weight, of the pigment used in the composition to insure against picking or dusting of the coating.

An object of the present invention has been to produce calcium sulfite, or the mixtures hereinbefore mentioned, in such form that their requirements of casein or other adhesives in the production of coating compositions will be greatly reduced.

Another object of the invention has been to produce salts of the character mentioned in an extremely finely divided state and with improved properties which render the same exceptionally well-suited for use as pigments in coating compositions or as fillers for paper and the like.

A further object of the invention has been to devise a method of and means for producing the improved salts, which are relatively inexpensive to install and are efficient and economical in their operation.

Figure 1:
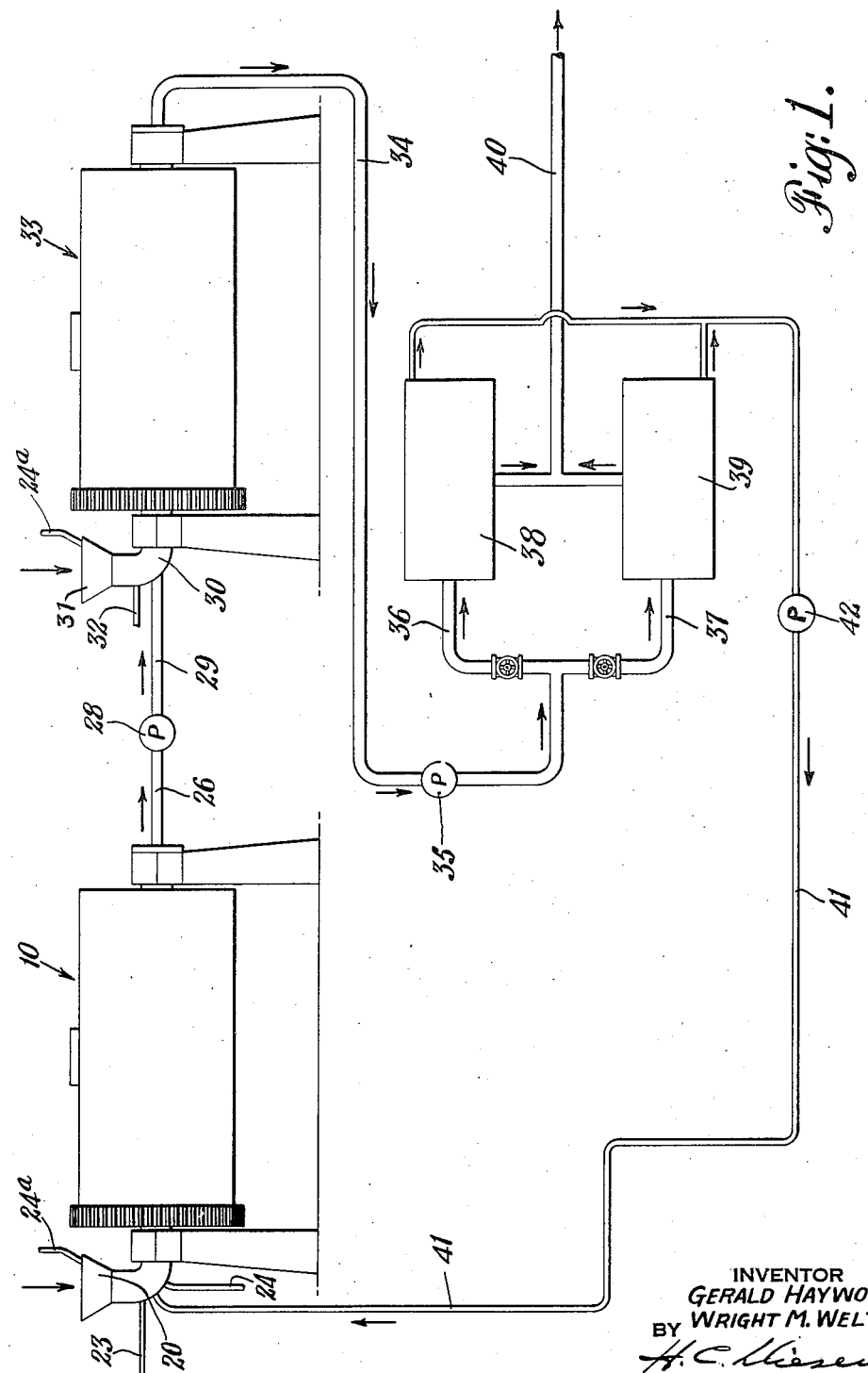
Figure 2:
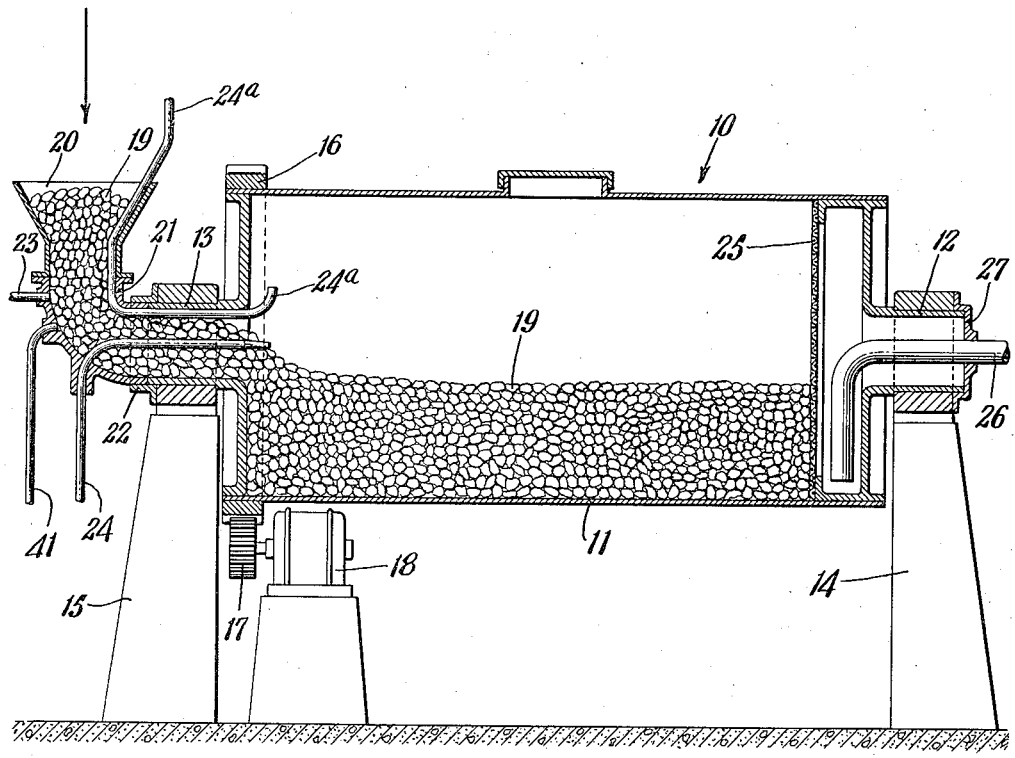

Other objects and advantages of the invention will appear from a detailed description of the same which will now be given in conjunction with the accompanying drawings in which:

Fig. 1 is a diagrammatic view illustrating one arrangement of apparatus that may be employed in accordance with the invention, and Fig. 2 is a longitudinal sectional view through a ball or pebble mill forming part of said apparatus.

Briefly, the invention involves the subjection of lumps or pebbles of an appropriate substance, serving as the starting material for the production of the desired salt, to a slow milling operation, while in a wet state, and simultaneously reacting it with an acidic agent capable of supplying the acid radical of the desired salt. Thus, in producing an improved type of calcium sulfite, lumps of limestone may be employed in a ball or pebble mill, the lumps serving the purpose of the balls or pebbles ordinarily employed in such a mill. As the mill is rotated, the lumps or pebbles are tumbled and ground against each other and are simultaneously reacted with an acidic agent which, in this case, may be sulfurous acid formed, for example, by the introduction of gaseous sulfur dioxide into the rotating drum. The result of this operation is that an extremely finely divided calcium sulfite is formed in suspension, the lumps of limestone being gradually consumed. The conditions are preferably such that a relatively low pH is established and maintained. This may be accomplished without introducing the sulfiting agent at a particularly rapid rate. It is probable that under the conditions of operation a portion of the calcium sulfite originally formed is converted into calcium bisulfite. But this eventually is reacted with the limestone on the surface of the lumps, or as it is ground from the lumps, to produce more calcium sulfite. Accordingly, there is no waste or by-product formed. If gaseous $SO_2$ is introduced into the pebble mill to form the desired sulfurous acid, it need not be of high concentration. A gas containing anywhere between 2% and 100% $SO_2$ will be found quite satisfactory. The reaction with the limestone may be readily regulated and may be made sufficiently slow, by retarding the grinding action, to enable a dilute gas having as little as 2% $SO_2$, or even less, to depress the pH to the desired point. Ordinarily, however, it will be found desirable to employ a gas having between, say, 8 and 20% $SO_2$, since this is usually more readily available and will supply the desired quantity of $SO_2$ with less volume than a more dilute gas. The pH maintained during the reaction may be as low as 2.5 or possibly lower, although it is preferably between 3.0 and 3.5 and may be as high as 5.0 or even 6.0. It has been found desirable, in a batch operation, to continue the operation of the ball mill for some time after the supplying of sulfur dioxide has been discontinued so that excess acidity of the resulting slurry may be eliminated. The final product is preferably substantially neutral, although it may be slightly acid or slightly alkaline. Should a mixture of calcium sulfite and calcium carbonate be desired as the final product, the mill may be operated for a longer period after the supply of $SO_2$ has been cut off so that any desired proportioning of the sulfite and carbonate may be provided. Or as an alternative, the desired mixture of any proportions, from substantially all calcium sulfite to one containing a substantial amount of calcium carbonate, may be produced by introducing the gas continuously during the grinding operation but at such a rate in relation to the rate of grinding that the pH is maintained between 6.0 and 7.0. If the product so formed contains a substantial amount of calcium sulfite it will be of high bulk comparable with that produced at a low pH, but its casein requirement will be relatively high.

Referring now to the drawings, the ball or pebble mill designated generally at 10 should have all of its interior surfaces formed of, or lined with, acid-proof material to avoid contamination of the product. It may comprise a drum or cylinder 11 of appropriate length and diameter having a pair of hollow trunnions 12 and 13 projecting axially at its opposite ends. These trunnions may be supported in any suitable way, as by means of pedestals 14 and 15 having appropriate bearings in which the trunnions may rotate. A ring gear 16 surrounding and secured to the cylinder 11 adjacent one end meshes with a pinion 17 connected with any suitable source of power, such as a motor 18.

Lumps 19 of the limestone or other raw material to be converted into the desired finely divided salt may be introduced into the ball mill through a hopper 20 which communicates with a suitable mixing chamber 21. The discharge end of this mixing chamber may be connected in any suitable way with the opening through the trunnion 13. An appropriate stuffing box or other sealing means 22 may be employed to permit relative rotation between the mixing chamber and the drum 11 without leakage of the contents of either the chamber or the drum. As will be later explained, a large part of the water or other liquid employed in the ball mill will preferably be recovered from the final product of the operation or at an intermediate stage and will be returned to the mixing chamber. However, any additional water or liquid that may be required to make up for that withdrawn with the finished product or which is otherwise lost may be introduced into the mixing chamber through a pipe 23. A pipe 24 is provided for the introduction, in either gaseous or liquid form, of whatever acidic agent may be employed in the process. If this acidic agent is in gaseous form, such as sulfur dioxide, the pipe 24 is preferably extended through the hollow trunnion 13 into the interior of the cylinder 11. A vent pipe 24a may be provided at any convenient point, as through the hopper 20 and trunnion 13, for venting the unused constituents of the gas introduced into the mill and any gases evolved in the course of the operation. Adjacent the opposite end of the cylinder a screen 25 may be employed for the purpose of retaining the lumps of the original charge while permitting the withdrawal of the slurry formed in the operation of the ball mill. The screen 25 may, however, be omitted if desired. Any suitable arrangement may be provided at the trunnion 12 for the removal of the slurry either continuously or at the end of a predetermined period of operation of the ball mill. A pipe 26 extending into the cylinder 11 through the trunnion 12 may be provided for this purpose. An appropriate closure 27 may be employed at the end of trunnion 12, this being secured to the pipe 26. Any appropriate packing means may be provided between the closure and trunnion to permit relative rotation of these parts without leakage.

A pump 28 may be employed to withdraw the slurry through the line 26 and to discharge the same through a line 29 into a mixing chamber 30 similar to the mixing chamber 21. A fresh charge of the material to be converted into the final product may be introduced into the chamber 30 in the form of lumps through a hopper 31, similar to the hopper 20, which may be appropriately connected with a source of supply. Any additional water that may be required may be introduced through a line 32. The mixing chamber 30 is connected with the drum 33 of a second ball or pebble mill, which may be constructed and operated in the same manner as the mill 10. However, if the system is to be operated on a continuous basis, no provision need be made for the introduction of an acidic agent into this second ball mill since its purpose is to consume the excess acidic agent carried by the slurry and introduced into the mixing chamber through the line 29. Depending upon the nature of the final product desired, the duration and rate of the second grinding operation may be appropriately controlled. If the final product is to be substantially all calcium sulfite, the grinding in the second ball mill will be considerably less than in the first. However, if it is desired to produce a mixture of finely divided calcium carbonate and calcium sulfite in which a substantial amount of the carbonate is present, this second grinding operation may be continued for a proportionately longer time or be carried out at a proportionately faster rate.

After the slurry has reacted sufficiently with the lumps or freshly ground material in the second ball mill it may be withdrawn through a line 34 and passed by means of a pressure pump 35 and valve-controlled lines 36 and 37 to one or the other of a pair of filter presses 38 and 39. Here a great deal of the water or other liquid is squeezed from the material and the remaining filter cake is withdrawn and passed through a line 40 to any suitable point for further disposition. It may be passed directly to a mill for use in a coating composition or the like or it may be passed to a dryer for removal of more of the water or other liquid. The filtrate from the filter presses may be returned to the mixing chamber 21 through a line 41 by a suitable pump 42 or it may be disposed of in any other suitable way. If it contains any sufficiently valuable ingredients in solution, it may be treated to recover these.

While the details of construction of the apparatus and the size of the various portions of the equipment will vary according to the circumstances and the particular product and quantity to be produced, it may be pointed out in general that the various portions of the equipment should be formed of appropriate materials or should be suitably lined so as to resist the corrosive action of the acidic agents, or the like, employed. In the production of calcium sulfite, for example, the ball mills may appropriately be lined with silex and the pumps and pipe lines through which the sulfurous acid must be passed should be lined with or formed of rubber or an anti-corrosive metal, such as chromium, or high chromium steel, or the like. In a relatively small plant, designed to produce about 50 lbs. of pigment, dry basis, per hour, the ball mill 10 may appropriately be 4 feet in diameter and 8 feet long. The ball mill 33 may be considerably smaller, if desired. Provision should be made for rotating the drums at any selected speeds between, say, 10 and 50 R. P. M. The flow of material into and out of the ball mill 10, in the typical small unit suggested, should be at the rate of about 1000 lbs. per hour, representing about 900 lbs. of water and 100 lbs. of pigment and raw material on a dry basis. The filter presses in such an installation may suitably be of the 18″ x 18″ x 12″ chamber type. It will be understood that suitable valves or other control devices may be provided in the various lines wherever required to regulate the introduction, withdrawal and circulation of the various materials according to any desired method of operation.

In the operation of the equipment for the production of improved calcium sulfite, 50 lbs. of crushed limestone may be introduced per hour into the hopper 20 and forced into the ball mill 10 at this rate along with about 50 lbs. of make-up water, introduced through the line 23, and additional water or slurry returned to the mill through the line 41. The crushed limestone may suitably be in lumps two or three inches, or even more, in their greatest dimensions. The gaseous sulfur dioxide, or sulfurous acid, or other acidic sulfiting agent, such as calcium bisulfite, should be introduced through the line 24 at a rate sufficient to maintain the mixture in the cylinder 11 at a pH of about 3. If sulfur dioxide is used, a relatively dilute gas may be employed. It may be supplied by a sulfur burner or from a source, usually available around paper mills and certain other industrial plants, in which gases containing $SO_2$ are developed. Drum 11 is preferably rotated at a rate of about 24 R. P. M. which will be found to tumble the material sufficiently to provide an effective grinding action. As the grinding proceeds, the lumps will, of course, be reduced until they are gradually consumed in forming the desired slurry.

The slurry withdrawn through the pipe 26 at the rate of about 1000 lbs. per hour, and consisting of finely divided calcium sulfite in suspension in sulfurous acid, with probably a certain amount of calcium bisulfite in solution, at a pH of about 3, is then preferably forced into the drum 33 of the second ball mill through the mixing chamber 30 where it is mixed with additional crushed limestone which may be of the same size as, or smaller than, that employed in the first ball mill. An appropriate amount of water to maintain a desired concentration may be introduced through the pipe 32. The quantity of water so added will depend upon the nature of the final product desired which will determine how much limestone is to be added to the slurry by grinding in the mill 33. In the filter presses the pigment may be removed with about an equal quantity of water while the balance of the water or filtrate will be returned through the line 41 to the first ball mill or otherwise disposed of.

If desired, the equipment may be operated as a batch process or semi-continuous process rather than as a continuous process in the manner explained. In a batch process the second ball mill 33 may be omitted, or by-passed, and the complete operation may be carried out in the ball mill 10. In such an operation sulfur dioxide, or other acidic agent, may be admitted to the drum 11 through the pipe 24 during the initial grinding period of, say, 5 hours and the supply of sulfur dioxide may then be cut off while the grinding continues for another period of, say, 1 hour. Fresh crushed limestone may be introduced continuously, if desired, or a desired quantity may be introduced at the commencement of the operation and replenished only at the commencement of the next cycle of operation. The contents of the ball bill may be subjected to the continuous grinding operation, as explained, for a period of, say, 6 hours without withdrawing any of the material from the drum, or, if desired, a continuous circulation of the material may be maintained throughout this period. In the latter case the sludge may be withdrawn at an appropriate rate, say 1000 lbs. per hour, and all may be returned to the mixing chamber 21 and re-introduced into the ball mill. After the two stages of the operation have been completed, i. e., the grinding in the presence of sulfurous acid at a pH of about 3 and the subsequent grinding without the introduction of fresh acid during which the pH rises to about 6.4, the slurry may be passed to the filter presses. By utilizing the two ball mills alternately in the same manner, a semi-continuous operation may be provided. In this case a somewhat different connection should be provided between the ball mills and the various auxiliary devices and provisions should be made for introducing the acidic agent into the second ball mill as well as the first. In any of the foregoing methods of procedure the neutralization of the slurry developed in the ball mill during the introduction of the acidic agent may be effected, either in whole or in part, by the addition of an appropriate amount of a suitable alkaline material, such as milk of lime. This may be added at any convenient point, as in either ball mill or in a separate tank. The extra or second grinding operation, during which no further acid is introduced, might in this way be eliminated.

In the production of the improved calcium sulfite in the laboratory in accordance with the invention, a ball mill jar was charged with 2 kg. of crushed limestone, of about hickory nut size, and with a liter of water. Into the jar was introduced a gas containing about 9½% $SO_2$, the gas being formed by mixing $SO_2$, derived from a cylinder, with air. This was introduced continuously for a period of five hours as the ball mill jar was rotated at a rate of about 52 R. P. M. The pH of the resulting slurry was maintained at about 3 throughout this operation. The rotation of the jar was then continued at the same rate for 45 minutes, without the introduction of additional $SO_2$, and the pH brought to substantially 7. The original limestone was analyzed and found to contain .16% $SiO_2$, .05% $Al_2O_3$—$Fe_2O_3$, 97.49% $CaCO_3$, and 2.31% $MgCO_3$. The slurry formed by the end of the operation mentioned was found to contain 83.90% $CaSO_3$. 157 grams of the limestone had been ground off of the original charge and approximately 107 grams of $SO_2$ were added during the operation.

The slurry resulting from the foregoing operation was filtered and dried and enough ammonia-cut casein was added to provide a coating composition which was good to a No. 6 wax of the Dennison graded waxes. It was found that for this purpose 15% casein was required, based on the weight of the pigment. The coating applied by a brush to the wire side of a sheet of regular coating raw stock of a weight of 40.6 lbs. per ream of 500 sheets, 25 x 38 and having a gloss of 13.2%, a brightness of 68.6% and opacity of 70.0%, the coating itself being of about 16 lb. weight, was calendered on a laboratory calender stack and the resulting surface was analyzed for gloss and brightness. Its gloss, as determined by a Bausch and Lomb glarimeter, was found to be 71% and its brightness, as determined by a Hunter multi-purpose reflectometer, was found to be 83.2%. The opacity of the sheet was also determined by a Nelson photo-electric opacimeter and found to be 80%. A 10-gram sample of the pigment was shaken in a cylinder made up to 100 cc. with distilled water and was found to settle to only 94 cc. at the end of 24 hours. This is an exceptionally high wet bulk.

In another laboratory operation of the same type as explained above, a mixture of air and sulfur dioxide having about 15% $SO_2$ was used, this being added at the rate of about 2.7 liters per minute. After three hours of milling under these conditions, grinding was continued for another 1¼ hours without gassing. 160 grams of the limestone were consumed in the operation. The slurry was drained on a Buchner funnel and washed and the filter cake was found to be very plastic and fine-grained. When subjected to a bulk test, i. e., 10 grams shaken in a graduated cylinder made up to 100 cc. with distilled water, the product was found not to settle noticeably in two hours and it settled only to 87.5 cc. in 24 hours. Sheets of raw stock of the type specified, coated with mixtures of this pigment and casein, in the manner explained above, were found to be safe to a No. 5 Dennison wax when 11% casein was used, to a No. 6-7 wax when 13% casein was used, and definitely to a No. 7 wax when 15% casein was used. The gloss of these three sheets was found to be 66, 62 and 58, respectively, and their brightness was found to be 81.7, 81.5 and 80.4, respectively. Chemical analysis of the product showed it to contain 76.33% $CaSO_3$.

From a large number and wide variety of other experimental operations of similar character, the following observations have been made:

1. If the pH is kept below 6.0 and preferably as low as 3.0 to 3.5 during the main period in which $CaSO_3$ is being formed, the resulting product will have a relatively low casein requirement, i. e., about 10 to 17% casein based on the weight of the pigment will be sufficient to produce a coating that is safe to a No. 6 Dennison wax. If this product is so formed as to contain a relatively high percentage of $CaSO_3$, say over 60%, it will have a relatively high bulk, (i. e., a 24-hour settling point of over 90) a high gloss, (over 65%) a high brightness, (over 82%) and good opacity (over 80%). Even with smaller amounts of $CaSO_3$, down to 25% or less, marked improvement over the plain ground limestone is noted with respect to bulk, gloss, brightness and opacity.

2. If the pH is kept above 6.0, say around 6.4, during the formation of substantially all of the $CaSO_3$, by introducing the $SO_2$ at a relatively slow rate, the casein requirement of the product will be relatively high, i. e., between 25 and 30% of the weight of the pigment when the latter contains a substantial amount of $CaSO_3$, say 50% or more. Such a product will, however, have high bulk (a 24-hour settling point over 90), good gloss, (over 50%) high brightness (over 81%) and good opacity (over 79%). A great improvement in these properties, over plain ground limestone, is noticeable when even a small percentage of $CaSO_3$ is included in the product and it is especially noticeable when the product is 50% or more $CaSO_3$.

3. In general it has been noted that the concentration of the $SO_2$ in the gas employed makes little difference. Good results have been obtained with gases containing between 2 and 100% $SO_2$. The important consideration in this respect is to supply an adequate quantity of $SO_2$ to react with the limestone as it is being ground and to maintain the desired pH.

4. While best results are obtained, from the standpoint of gloss and brightness, when a relatively white type of limestone is used, excellent results may also be obtained with limestones of average color, i. e., grayish, or even with relatively dark, blackish limestones. The bulk of $CaSO_3$ produced from these darker stones is just as good as that produced from the light stone and the opacity is somewhat better. The stone of average color was found to be softer than the other types employed and, therefore, ground off more rapidly at a given speed of operation of the ball mill. To offset this and maintain the desired pH, it was necessary to increase the rate of introduction of $SO_2$. The same result might be obtained by reducing the speed of rotation of the ball mill.

The following specific examples of operation which have been performed may be cited as illustrative of the principles and observations expressed in the foregoing. In these experiments it will be understood that the laboratory ball mill equipment was used in the manner previously explained and the determinations given in the following tables were made in the ways hereinbefore indicated:

*Series I.—$CaSO_3$ formed at low pH*

[Further grinding relied upon to neutralize]

| Grinding with $SO_2$ | | Grinding without $SO_2$ | | Per cent $CaSO_3$ | 24-hour bulk | Per cent casein | Per cent gloss | Per cent brightness | Per cent opacity |
|---|---|---|---|---|---|---|---|---|---|
| Hour | pH | Hour | pH | | | | | | |
| No | $SO_3$ | 5 | 8.9/8.4 | None | 21 | 7 | 30.0 | 80.4 | 78.0 |
| 1 | 3.6 | 4 | 6.4 | 25.43 | 34 | 10 | 49.8 | 80.8 | 78.4 |
| 2 | 3.4 | 3 | 6.4 | 44.23 | 55 | 11 | 61.5 | 81.2 | 78.2 |
| 3 | 3.4 | 2 | 6.6 | 64.67 | 92 | 15 | 68.0 | 82.4 | 80.7 |
| 4 | 3.7/3.3 | 1 | 6.5 | 80.35 | 91 | 16.7 | 68.3 | 84.9 | 82.4 |
| 5 | 3.6/3.2 | 1 | 6.4 | 85.72 | 90 | 16.7 | 66.9 | 84.9 | 82.5 |

*Series II.—$CaSO_3$ formed at low pH*

[No further grinding]

| | pH grinding | Per cent $CaSO_3$ | Casein demand | Gloss | Brightness | Opacity | 24-hour bulk |
|---|---|---|---|---|---|---|---|
| | | | Per cent | | | | |
| Acid slurry filtered and washed | 3.7-3.0 | 87.10 | 14 | 69.0 | 84.5 | 81.9 | 92 |
| Neutralized with CaO | [1] 3.4-2.9 | 86.70 | 18.3 | 61.4 | 84.0 | 82.2 | 82 |

[1] After adding CaO, pH 6.4.

*Series III.—CaSO₃ formed at high pH*

| pH of grind | Per cent CaSO₃ | 24-hour bulk | 16 lb. coat sized to No. 6 wax |  |  |  |
|---|---|---|---|---|---|---|
|  |  |  | Per cent casein | B. & L. gloss | Hunter brightness | Nelson opacity |
| 8.6 | None | 21 | 7 | 30.0 | 80.4 | 78.0 |
| 6.2 | 15.10 | 51 | 15 | 37.1 | 79.4 | 78.6 |
| 6.2 | 50.10 | 92 | 25 | 51.0 | 81.6 | 79.6 |
| 6.2 | 73.80 | 93 | 30 | 64.5 | 82.6 | 81.0 |
| 6.2 | 79.37 | 93 | 30 | 63.5 | 83.8 | 82.1 |

*Series IV.—Different colored limestone used*

| Color of stone used | Per cent CaSO₂ | 24-hour bulk | Per cent casein demand | Per cent gloss B. & L. | Per cent brightness | Per cent opacity | Lb. coat per ream |
|---|---|---|---|---|---|---|---|
| Very dark | 79.87 | 87 | 15 | 58.5 | 74.2 | 83.2 | 16.2 |
| Average color | 76.71 | 88 | 25 | 60.2 | 82.4 | 82.5 | 15.9 |
| Very light | 85.72 | 90 | 16.7 | 66.9 | 84.9 | 82.5 | 16.0 |

For purposes of comparison, samples of calcium sulfite produced by the reaction of a fine spray of concentrated milk of lime with gaseous $SO_2$, according to the method disclosed in the Haywood Patent No. 2,210,405, granted August 6, 1940, were subjected to similar tests with the following results: One sample was found to contain 86.92% $CaSO_3$, required 40% casein to make it good to a No. 6 Dennison wax, produced a sheet under the conditions specified above, having a gloss of 35, an opacity of 79.5, and a brightness of 79.8 and the product had a 24-hour settling point, under the conditions mentioned, of 37. Another sample of calcium sulfite, produced commercially by the same prior method, was found to contain 70.1% $CaSO_3$, required 40% casein to make it good to a No. 6 Dennison wax and, when applied as a coating of the same weight to a sheet of the same standard as mentioned above, was found to have a gloss of 32, opacity of 78.0 and a brightness of 76.0, while the pigment itself was found to settle to 37 cc. in a 24-hour bulk test.

While the invention is particularly well suited for the production of extremely finely divided types of calcium sulfite and mixtures of the same with calcium carbonate having desirable characteristics for coating pigment purposes, it is applicable also to the production of other alkaline earth metal sulfites or mixtures of the same with their carbonates. By employing crushed dolomitic limestone, for example, in lieu of pure calcium limestone or calcite in any of the procedures hereinbefore explained, a mixture of magnesium and calcium sulfite may be produced. If the grinding is continued after the sulfiting agent has been cut off, a mixture of the two sulfites and the two carbonates may be produced, the proportions varying with the nature of the original limestone and the extent of conversion. Due to the much greater solubility of magnesium sulfite as compared with calcium sulfite, this method provides a convenient way of separating the lime and magnesia in the original dolomitic limestone. The operation may be such, for example, that all, or substantially all, of the magnesium sulfite produced will be dissolved and removed with the filtrate at the filter presses. The filter cake may be thoroughly washed, if desired, to free it of magnesium sulfite so that the remaining solids will be substantially pure calcium sulfite. In lieu of returning the filtrate to the ball mill in this case, it may be treated in a suitable manner to recover magnesia therefrom.

In the production of any alkaline earth metal sulfites, as suggested in the foregoing, the grinding action of the crushed, initial material may be supplemented, if desired, by the use of the pebbles or balls ordinarily employed in mills of the character disclosed. For example, half the usual quantity of pebbles or balls might be employed and a similar quantity of crushed limestone or the like might be maintained in the ball mill drum.

While a preferred form of the invention and a variety of modifications thereof have been disclosed in considerable detail, it will be understood that other variations in the method and in the apparatus, as well as in the resulting product, may be made without departing from the general principles and scope of the invention.

What we claim is:

1. A method of producing a finely divided alkaline earth metal sulfite for use as a pigment material, which comprises subjecting lumps of alkaline earth metal carbonate to the simultaneous action of attrition, an acid sulfiting agent, and sufficient water to form a slurry of the sulfite produced whereby to remove same as formed from the surface of the lumps, the sulfiting agent being maintained in sufficient concentration to keep the slurry acid in the range of pH 2.5 to 6.

2. A method of producing a finely divided alkaline earth metal sulfite for use as a pigment material, which comprises subjecting lumps of alkaline earth metal carbonate to the simultaneous action of attrition, an acid sulfiting agent, and sufficient water to form a slurry of the sulfite produced whereby to remove same as formed from the surface of the lumps, the sulfiting agent being maintained in sufficient concentration to keep the slurry acid in the range of pH 2.5 to 6, and thereafter neutralizing said slurry.

3. A method of producing a finely divided alkaline earth metal sulfite for use as a pigment material, which comprises subjecting lumps of alkaline earth metal carbonate to the simultaneous action of attrition, an acid sulfiting agent, and sufficient water to form a slurry of the sulfite produced whereby to remove same as formed from the surface of the lumps, the sulfiting agent being maintained in sufficient concentration to keep the slurry acid in the range of pH 2.5 to 6, and thereafter raising the pH of said slurry to the desired point by continuing the attrition without continuing the addition of the sulfiting agent.

4. A method of producing a finely divided calcium sulfite having a low adhesive requirement and otherwise suitable for use as a pigment material, which comprises subjecting lumps of limestone to the simultaneous action of attrition, an acid sulfiting agent and sufficient water to form a slurry of the calcium sulfite produced whereby to remove same as formed from the surface of the lumps, the sulfiting agent being maintained in sufficient concentration to keep the slurry acid in the range of pH 2.5 to 6.

5. The method according to claim 4, after a sufficient quantity of the slurry has been produced, continuing the attrition while discontinuing adding the sulfiting agent until the slurry is substantially neutralized.

6. A method of producing a finely divided calcium sulfite having a low adhesive requirement and otherwise suitable for use as a pigment material, which comprises subjecting lumps of limestone to the simultaneous action of attrition, an acid sulfiting agent and sufficient water to form a slurry of the calcium sulfite produced whereby to remove same as formed from the surface of the lumps, the sulfiting agent being maintained in sufficient concentration to keep the slurry in the pH range 2.5 to 4.

7. The method according to claim 1 in which the attrition called for is that produced substantially solely by the limestone lumps rubbing against one another.

8. The method of producing finely divided calcium sulfite having a low adhesive demand and being otherwise suitable for use as a pigment material for coating compositions, which comprises subjecting limestone lumps to the simultaneous action of tumbling, an acid sulfiting agent and sufficient water to form a slurry of the calcium sulfite produced, the sulfiting agent being maintained in sufficient concentration to keep the slurry acid in the range of pH 2.5 to 6.

9. A method of producing finely divided calcium sulfite having a low adhesive demand and being otherwise suitable for use as a pigment material in coating compositions, which comprises tumbling limestone lumps with water to effect a slow grinding of said lumps, and simultaneously subjecting the same to the action of an acid sulfiting agent, the water being present in sufficient amount to form a slurry of the produced calcium sulfite and the sulfiting agent being maintained in sufficient concentration to keep the pH of the slurry in the approximate range of 2.5 to 4.

10. A method of producing finely divided calcium sulfite having a low adhesive demand and being otherwise suitable for use as a pigment material in coating compositions, which comprises tumbling limestone lumps with water to effect a slow grinding of said lumps, and simultaneously subjecting the same to the action of an acid sulfiting agent, the water being present in sufficient amount to form a slurry of the produced calcium sulfite and the sulfiting agent being maintained in sufficient concentration to keep the pH of the slurry in the approximate range 2.5 to 4, and subsequently neutralizing the resulting slurry.

11. A method of producing a finely divided calcium sulfite having a low adhesive requirement and otherwise suitable for use as a pigment material, which comprises subjecting lumps of limestone to the simultaneous action of attrition, an acid sulfiting agent comprising gaseous sulfur dioxide and sufficient water to form a slurry of the calcium sulfite produced whereby to remove same as formed from the surface of the lumps, the sulfiting agent being maintained in sufficient concentration to keep the slurry acid in the range of pH 2.5 to 6.

12. A method of producing a finely divided calcium sulfite having a low adhesive requirement and otherwise suitable for use as a pigment material, which comprises subjecting lumps of limestone to the simultaneous action of attrition, an acid sulfiting agent comprising calcium bisulfite and sufficient water to form a slurry of the calcium sulfite produced whereby to remove same as formed from the surface of the lumps, the sulfiting agent being maintained in sufficient concentration to keep the slurry acid in the range of pH 2.5 to 6.

13. A method of producing a finely divided calcium sulfite having a low adhesive requirement and otherwise suitable for use as a pigment material, which comprises subjecting lumps of dolomitic limestone to the simultaneous action of attrition, an acid sulfiting agent and sufficient water to form a slurry of the calcium sulfite produced whereby to remove same as formed from the surface of the lumps, the sulfiting agent being maintained in sufficient concentration to keep the slurry acid in the range of pH 2.5 to 6, dissolving the formed magnesium sulfite in water and separating the solids comprising calcium sulfite from the solution.

14. A finely divided coating pigment comprising predominantly calcium sulfite and produced in accordance with the method of claim 4, said pigment having a 24-hour settling point of not less than 50 when 10 grams of same are made up to 100 cc. with distilled water and shaken into suspension, but nevertheless requiring less than 20% casein based upon its dry weight to make it safe to a number 6 Dennison graded wax when applied as a coating having a weight of 16 pounds per ream of 500 sheets 25 by 38 inches, which has a gloss when used as such a coating of not less than 50% as determined by a Bausch and Lomb glarimeter and having an opacity at least equal to calcium sulfite produced by the sulfitation of lime.

15. A finely divided coating pigment comprising predominantly calcium sulfite and produced in accordance with the method of claim 4, said pigment having a 24-hour settling point of not less than 70 when 10 grams of same are made up to 100 cc. with distilled water and shaken into suspension, but nevertheless requiring less than 20% casein based upon its dry weight to make it safe to a number 6 Dennison graded wax when applied as a coating having a weight of 16 pounds per ream of 500 sheets 25 by 38 inches, which has a gloss when used as such a coating of not less than 60% as determined by a Bausch and Lomb glarimeter and having an opacity at least equal to calcium sulfite produced by the sulfitation of lime.

16. A finely divided coating pigment comprising predominantly calcium sulfite and produced in accordance with the method of claim 5, said pigment having a 24-hour settling point of not less than 50 when 10 grams of same are made up to 100 cc. with distilled water and shaken into suspension, but nevertheless requiring less than 20% casein based upon its dry weight to make it safe to a number 6 Dennison graded wax when applied as a coating having a weight of 16 pounds per ream of 500 sheets 25 by 38 inches, which has a gloss when used as such a coating of not less than 50% as determined by a Bausch and Lomb glarimeter and having an opacity at least equal to calcium sulfite produced by the sulfitation of lime.

GERALD HAYWOOD.
WRIGHT M. WELTON.